United States Patent
Aratani et al.

(10) Patent No.: US 9,784,972 B2
(45) Date of Patent: Oct. 10, 2017

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Shinichi Aratani, Kawasaki (JP); Kazuki Takemoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/852,118

(22) Filed: Sep. 11, 2015

(65) Prior Publication Data

US 2016/0078641 A1    Mar. 17, 2016

(30) Foreign Application Priority Data

Sep. 12, 2014 (JP) ................. 2014-186531

(51) Int. Cl.
```
G09G 5/14      (2006.01)
G02B 27/01     (2006.01)
G06T 19/00     (2011.01)
G06T 7/73      (2017.01)
```

(52) U.S. Cl.
CPC .............. *G02B 27/017* (2013.01); *G06T 7/73* (2017.01); *G06T 19/006* (2013.01); *G02B 2027/0181* (2013.01)

(58) Field of Classification Search
CPC .................................................. G02B 27/017
USPC ....................................................... 345/633
See application file for complete search history.

(56) References Cited

U.S. PATENT DOCUMENTS

| 7,808,450 | B2 * | 10/2010 | Wanda | G06F 3/011 345/633 |
| 9,448,407 | B2 * | 9/2016 | Kimura | G02B 27/0172 |
| 2006/0273984 | A1 * | 12/2006 | Wanda | G06F 3/011 345/7 |
| 2012/0194554 | A1 * | 8/2012 | Kaino | G08B 13/19621 345/633 |
| 2012/0320088 | A1 * | 12/2012 | Ihara | G05B 23/0216 345/629 |
| 2014/0168266 | A1 * | 6/2014 | Kimura | G02B 27/0172 345/633 |

FOREIGN PATENT DOCUMENTS

| JP | 2006-301924 A | 11/2006 |
| JP | 2012-155654 A | 8/2012 |
| JP | 2013-257716 A | 12/2013 |

* cited by examiner

*Primary Examiner* — Javid A Amini
(74) *Attorney, Agent, or Firm* — CANON USA, INC., IP Division (57) ABSTRACT

A warning information output outputs warning information for a user, based on a position of the user and a position of a real object with which data is associated in a case where a first attribute indicates outputting of the warning information for the user. An image output outputs an image to be generated, in a case where a second attribute indicates drawing of a virtual object in accordance with the position of the real object and a position at which the virtual object to be viewed by the user is arranged, by not drawing the virtual object in a region in which the position of the real object with which the data is associated is closer to the position of the user than the position at which the virtual object is arranged.

17 Claims, 9 Drawing Sheets

CREATE MODEL
SHAPE:  SIZE:
3010 — [PLANE] [CUBE] [QUADRANGULAR PRISM]  [SMALL ▽] — 3020
3030 — [CREATE NEWLY (N)]  [LOAD (N)] — 3040
ATTRIBUTE:
3050 — [APPROACH WARNING NOTIFICATION MODEL ▽]

ACQUIRE IMAGE
[CAPTURE (G)]

EDIT MODEL
SIZE:  POSITION:
A: [  ] mm  X: [  ] mm
3070 — B: [  ] mm  Y: [  ] mm
C: [  ] mm  Z: [  ] mm
3100 — [DELETE (D)]

WARNING RANGE
DISTANCE: [  ] mm — 3090

[OK]  [CANCEL]

INFORMATION PROCESSING APPARATUS, INFORMATION PROCESSING METHOD, AND STORAGE MEDIUM

BACKGROUND OF THE INVENTION

Field of the Invention

The present invention relates to a method for providing a mixed reality in which an image of a real space is displayed with a virtual object superimposed thereon.

Description of the Related Art

A mixed reality (MR) technique and an augmented reality (AR) technique are known as techniques for merging a real world with a virtual world in real time. These techniques seamlessly merge a real space with a virtual space created by a computer. It is expected that these techniques are applied to a variety of fields including an assembly support in which operation procedures and wiring conditions are superimposed on a display during an assembly operation and a construction simulation in which the interior and the exterior of a building are checked prior to the actual construction through computer graphics (CG) superimposed on a display.

Apparatuses that allow a user to sense a virtual object as if the virtual object is present in a real space includes a head-mounted display (HMD). In particular, a video see-through HMD captures an image of a real world with a mounted video camera and displays a composite image obtained by superimposing a virtual object on the captured image in real time on a display unit such as a display to thus present the composite image to the user.

When a display unit with a strong sense of immersion such as an HMD is used, there is a possibility that a user among a plurality of users experiencing the MR does not notice another user approaching him or her and comes very close to the another user. Thus, Japanese Patent Application Laid-Open No. 2006-301924 discusses a method in which a viewpoint position and its direction of a first user and a viewpoint position and its direction of a second user are obtained and the first user is notified of the second user approaching the first user when the distance between the first and second users falls below a threshold value.

However, the method discussed in Japanese Patent Application Laid-Open No. 2006-301924 has shortcomings in that a user cannot be notified of a real object, such as a table and a wall, present in the real space that the user is approaching since the method is directed to notifying the user of another user approaching him or her.

SUMMARY OF THE INVENTION

According to an aspect of the present invention, an information processing apparatus includes, for example, a setting unit configured to set at least one of a first attribute and a second attribute that is different from the first attribute in a first virtual object generated based on virtual object model data, a generation unit configured to generate the first virtual object at a position in a virtual space corresponding to a predetermined position in a real space based on the at least one of the first and second attributes set by the setting unit and the virtual object model data, a position acquisition unit configured to acquire a position of a user, a distance calculation unit configured to calculate a distance between the user and the first virtual object based on the position of the user and the position of the first virtual object generated by the generation unit, a virtual image generation unit configured to generate a virtual image to be viewed by the user by drawing a second virtual object that is different from the first virtual object, and an output unit configured to output the virtual image. In a case in which the setting unit has set the first attribute in the first virtual object, if the distance calculated by the distance calculation unit indicates a value less than a threshold value, the output unit further outputs information indicating that the user is approaching the predetermined position in the real space. In a case in which the setting unit has set the second attribute in the first virtual object, the virtual image generation unit does not draw the second virtual object in a region in which the position of the first virtual object is closer to the position of the user than the position of the second virtual object is and draws the second virtual object in a region in which the position of the first virtual object is farther from the position of the user than the position of the second virtual object is.

According to the present specification, it is possible to notify a user that the user is approaching a real object in a real space.

Further features of the present invention will become apparent from the following description of exemplary embodiments with reference to the attached drawings.

DESCRIPTION OF THE EMBODIMENTS

Prior to describing exemplary embodiments of the present invention, a hardware configuration for implementing an information processing apparatus according to each of the exemplary embodiments will be described with reference to FIG. 9.

Figure 9:
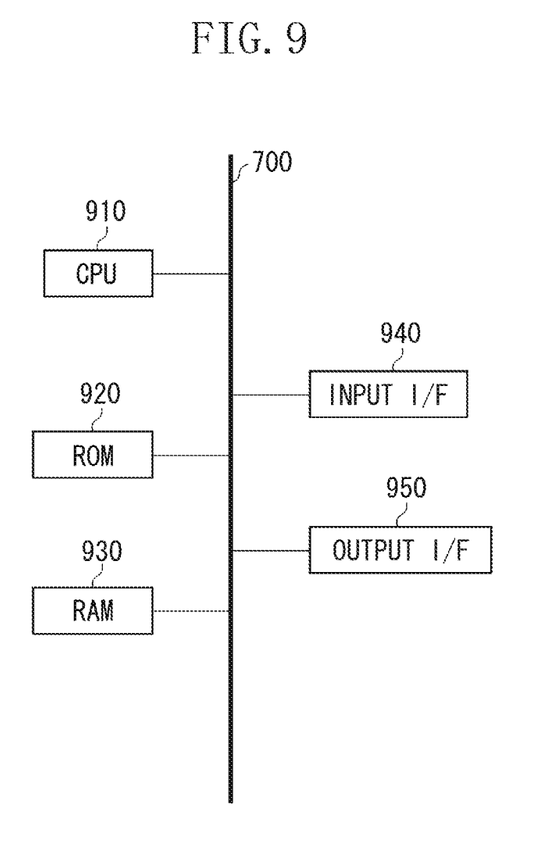
FIG. 9 illustrates an exemplary hardware configuration of a computer that can be applied to a system according to an exemplary embodiment of the present invent ion.

FIG. 9 illustrates a hardware configuration of an information processing apparatus according to the present exemplary embodiment. With reference to FIG. 9, a central processing unit (CPU) 910 integrally controls each of the devices connected thereto through a bus 700. The CPU 910 reads processing procedures or a program stored in a read-only memory (ROM) 920 and executes the read processing procedures or program. In addition to an operating system (OS), processing programs and device drivers according to the present exemplary embodiment are stored in the ROM 920, and the processing programs and the device drivers are temporarily stored in a random-access memory (RAM) 930 and executed by the CPU 910, as appropriate. An input interface (I/F) 940 receives from an external apparatus (display apparatus, operation apparatus, etc.) an input signal in a format that can be processed by the information processing apparatus. An output I/F 950 outputs to an external apparatus (display apparatus) an output signal in a format that can be processed by the display apparatus.

Hereinafter, exemplary embodiments of the present invention will be described with reference to the appended drawings.

In a first exemplary embodiment, a virtual object is associated with a position of a real object arranged in a real space, and an attribute for an approach warning notification is appended to this virtual object. Then, an exemplary embodiment is described in which a user is notified that the user is approaching the real object when the distance between a measurement target and the virtual object to which the attribute for the approach warning notification has been appended is reduced.

Figure 1:
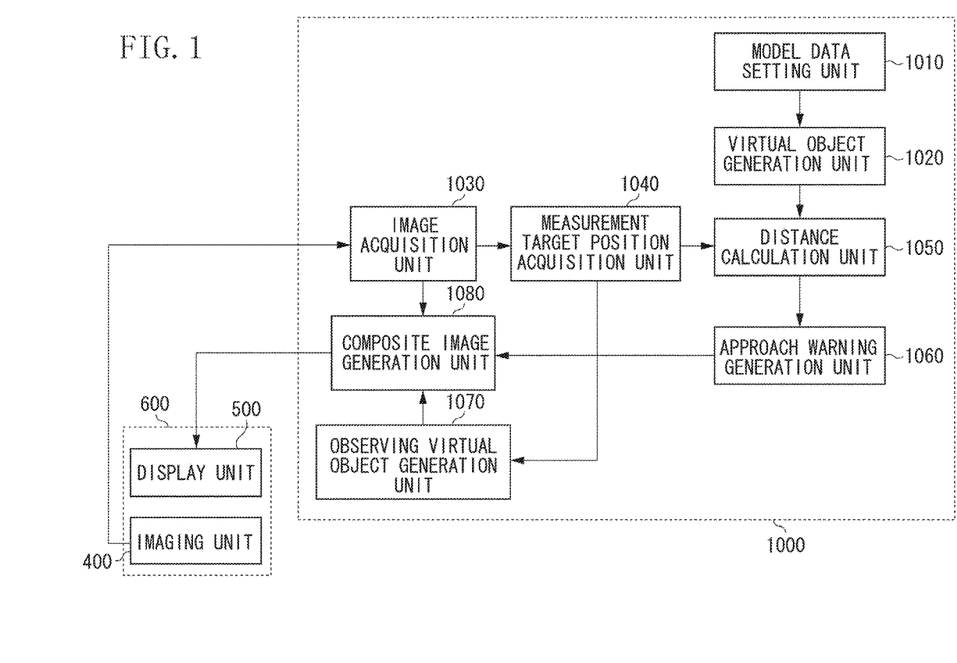
FIG. 1 illustrates a configuration of an information processing apparatus according to a first exemplary embodiment.

FIG. 1 illustrates a configuration of an information processing apparatus 1000 and a head-mounted display (HMD) 600 according to the first exemplary embodiment. The information processing apparatus 1000 includes a model data setting unit 1010, a virtual object generation unit 1020, an image acquisition unit 1030, a measurement target position acquisition unit 1040, a distance calculation unit 1050, an approach warning generation unit 1060, an observation virtual object generation unit 1070, and a composite image generation unit 1080. The information processing apparatus 1000 is connected to the HMD 600 through a cable or wirelessly. The HMD 600 includes an imaging unit 400 and a display unit 500.

Figure 3:
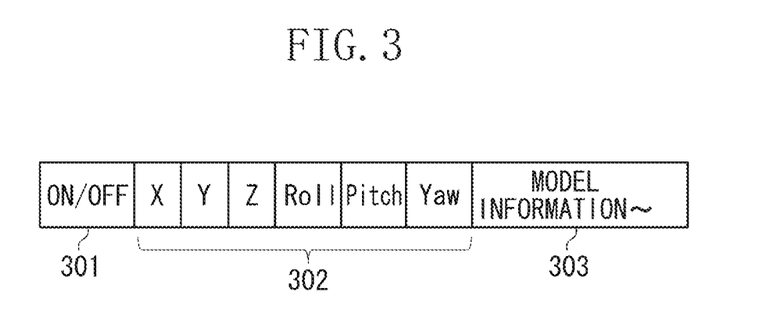
FIG. 3 illustrates an exemplary structure of model data of a single virtual object.

The model data setting unit 1010 sets model data of a virtual object. FIG. 3 illustrates an exemplary structure of model data of a single virtual object. Model data of a virtual object to be drawn in the present exemplary embodiment includes position and orientation information 302 that indicates the position and the orientation (position (x, y, z) and orientation (roll, pitch, yaw)) of the virtual object, and model information 303 that is visual information such as the color and the shape of the virtual object. In addition, the model data includes an approach warning notification attribute flag 301 for indicating whether this virtual object is a target of an approach warning notification. The approach warning notification attribute flag 301 is expressed in one bit indicating ON/OFF. For example, when the value of the approach warning notification attribute flag 301 is 1 (ON), this indicates that the corresponding virtual object is a target of an approach warning notification. Meanwhile, when the value of the approach warning notification attribute flag 301 is 0 (OFF), this indicates that the corresponding virtual object is not a target of the approach warning notification. Here, a determination of a virtual object to set to ON the approach warning notification attribute flag 301 may be made in accordance with an instruction input by the user through a user interface (UI). In addition, in order to notify a user that the user is approaching an object such as a wall, the approach warning notification attribute flag 301 (setting information) may be automatically set to ON with respect to a virtual object having an area equal to or greater than a predetermined size.

Figure 8:
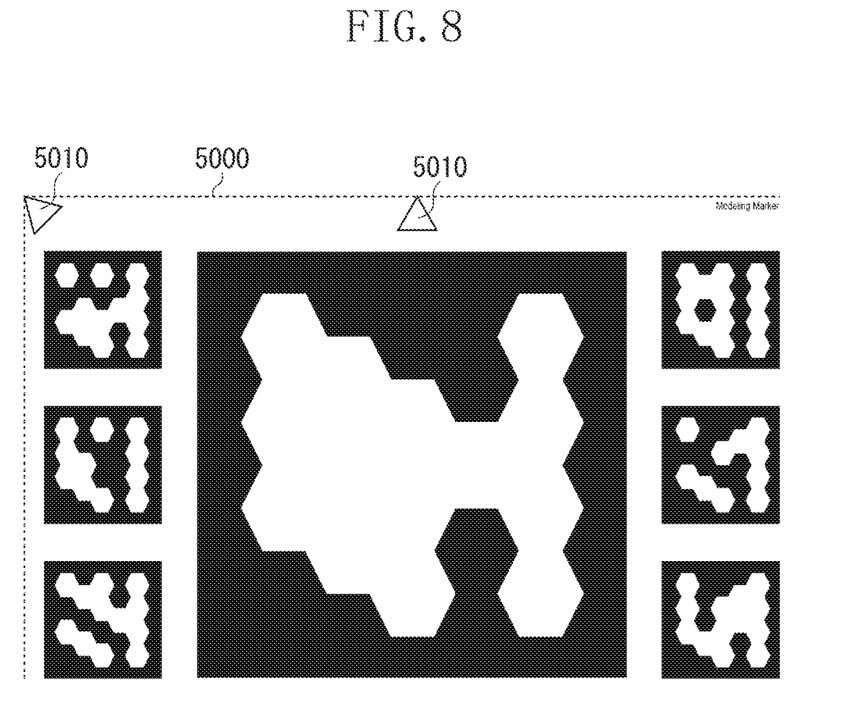
FIG. 8 is an illustration for describing an index for disposing a model.

The virtual object generation unit 1020 generates a virtual object having the model data whose attribute has been set by the model data setting unit 1010. The virtual object having the model data whose attribute has been set is associated with indices indicated on a board that the user can carry around, as illustrated in FIG. 8. When an index is recognized from an image including the indices indicated on the board, a virtual object is generated at the position at which the recognized index is arranged.

The image acquisition unit 1030 acquires from the HMD 600 an image captured by the imaging unit 400 of the HMD 600. The image acquisition unit 1030 is implemented, for example, by an IEEE 1394 interface board if an output of the HMD 600 (imaging unit 400) is a digital output such as IEEE 1394. Alternatively, the image acquisition unit 1030 is implemented by an analog video capture board if an output of the HMD 600 (imaging unit 400) is an analog output such as an NTSC signal. In addition, digital data of a still image or a moving image stored in advance in a storage device (not illustrated) may be read.

The measurement target position acquisition unit 1040 acquires the position of a measurement target. In the present exemplary embodiment, the HMD 600 is illustrated as a measurement target. The measurement target position acquisition unit 1040 may obtain the position of the HMD 600 through any known technique. In the present exemplary embodiment, however, the position of the HMD 600 is obtained by imaging a known index included in an image captured by the imaging unit 400 of the HMD 600.

Figure 4A:
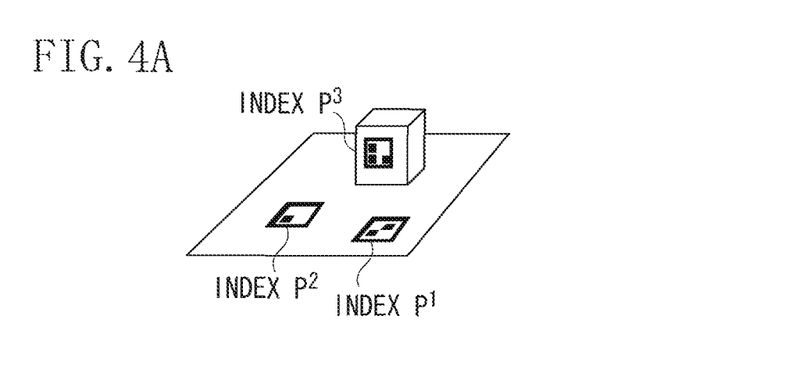
FIGS. 4A, 4B, and 4C are illustrations for describing an index.
Figure 4B:
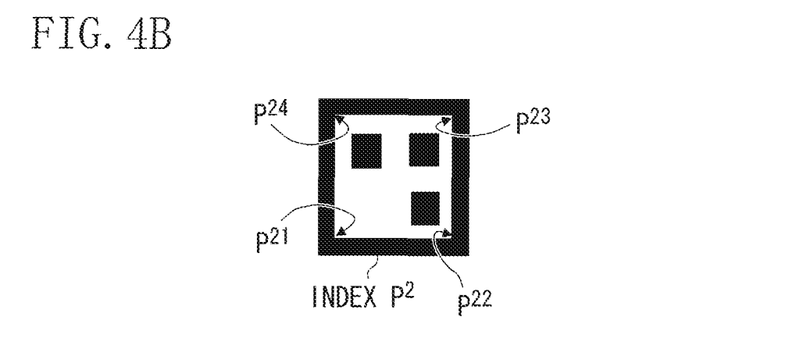

A method of obtaining positional information of an imaging device by imaging an index having a known coordinate is well known, and thus detailed description thereof will be omitted. With regard to the index, a plurality of rectangular indices as illustrated in FIG. 4 is arranged in an environment. Each index to be arranged is expressed by $P^k$ ($k=1 \ldots K_o$). Here, $K_o$ is the number of indices to be arranged ($K_o=3$ in the example illustrated in FIG. 4A). As illustrated in FIG. 4B, a rectangular index has a pattern representing an identifier arranged thereinside and can be uniquely identified. In addition, a rectangular index $P^k$ is formed by vertices $p^{ki}$ ($i=1 \ldots N_k$). Here, $N_k$ indicates the total number of vertices forming the index $P^k$ (in the present exemplary embodiment, $N_k=4$ since the index is rectangular). A captured image is subjected to a binarization process and then to a labeling process, and an index formed by four straight lines is extracted as an index candidate from among a region having an area equal to or greater than a predetermined size. Furthermore, a determination as to whether a candidate region is an index region is made by determining whether a specific pattern is present in the candidate region. Then, the direction and the identifier within an image of the index are acquired by reading the pattern inside the index region, and thus an index is detected from the acquired image.

Figure 4C:
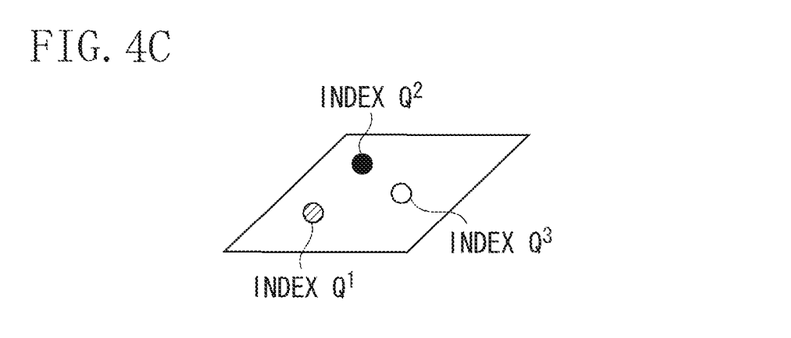

It is to be noted that the index $P^k$ arranged in an environment or on a target object is not limited to a rectangular index and may take any form that can be detected in a captured image and that allows the given index to be identified as appropriate. For example, as illustrated in FIG. 4C, point indices such as circular indices having mutually different colors may instead be used. In this case, regions corresponding to the colors of the respective indices are detected on an image, and the centroid position of the region is set as a detected coordinate of the index. Alternatively, feature points (natural feature points) having mutually different texture features may serve as the point indices. In this case, an index is extracted from an image by subjecting the image to template matching by a template image of each index stored in advance as known information. The indices are not limited to the above, and any index that can be fixed in a space and that can be detected from a captured image may be used. It is to be noted that placement information of an index is considered to be known when the disposition information is created through any method.

Alternatively, a position and orientation sensor may be mounted on the HMD 600, and an output value of the sensor may be used to indicate the position and the orientation of the imaging unit 400. When the position and orientation sensor is used, the positional relation between the position and orientation sensor and the imaging unit 400 is calibrated in advance, and an output value of the position and orientation sensor may be used to indicate the position and the orientation of the HMD 600.

The distance calculation unit 1050 calculates the distance between the position at which the virtual object is generated by the virtual object generation unit 1020 and the position of the measurement target. Then, the distance calculation unit 1050 determines whether the calculated distance is less than a predetermined value. The distance calculation unit 1050 transmits the result of the determination to the approach warning generation unit 1060.

Figure 5A:
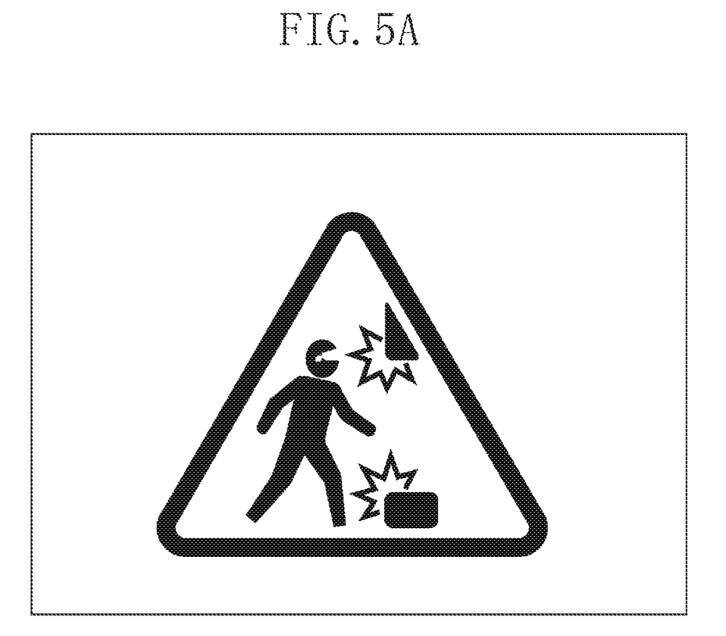
FIGS. 5A and 5B are illustrations for describing presentation information of an approach warning notification.
Figure 5B:
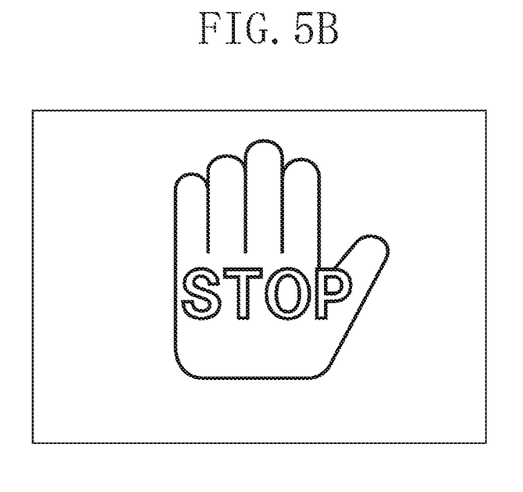

The approach warning generation unit 1060 determines whether the user needs to be notified of the approach. If it is determined that the user needs to be notified, the approach warning generation unit 1060 generates presentation information for an approach warning. The presentation information for the approach warning is displayed on the display unit 500 of the HMD 600. The presentation information for the approach warning notification is, for example, icons as illustrated in FIGS. 5A and 5B. In addition, a possible approach may be represented by characters, and an image may be presented with these characters superimposed thereon. The generated presentation information is transmitted to the HMD 600.

The observation virtual object generation unit 1070 acquires information on a virtual object to be viewed for the user to experience a mixed reality and generates an observation virtual object. In the present exemplary embodiment, a virtual object which has been generated by the virtual object generation unit 1020 and whose attribute has been set and the observation virtual object differ from each other in terms of their intended uses and also differ from each other in terms of whether an attribute of the approach warning notification attribute flag 301 illustrated in FIG. 3 is set as described above. The information on the observation virtual object may be stored in advance in a memory (not illustrated) or may be read from a storage medium. A virtual object is generated (by rendering) in accordance with the acquired information on the virtual object and the position and the orientation of the HMD 600.

The composite image generation unit 1080 combines the virtual object generated by the observation virtual object generation unit 1070 with an image acquired by the image acquisition unit 1030 and generates a composite image. In a case in which the presentation information for the approach warning has been transmitted from the approach warning generation unit 1060, the presentation information for the approach warning is also superimposed on the composite image. The generated composite image is output to the HMD 600.

These functional units are implemented when the CPU 910 loads a program stored in the ROM 920 onto the RAM 930 and executes processes in accordance with the flowcharts described later. In a case in which hardware is constructed as an alternative to the software process using the CPU 910, for example, an arithmetic unit and a circuit may be constituted so as to correspond to the process of each of the functional units described herein.

Subsequently, each of the units in the HMD 600 will be described.

The imaging unit 400 is a video camera for imaging a real space in which an index is arranged. The imaging unit 400 transmits a captured image to the information processing apparatus 1000.

The display unit 500 is a display that receives a composite image transmitted from the information processing apparatus 1000 and displays the composite image.

Figure 2:
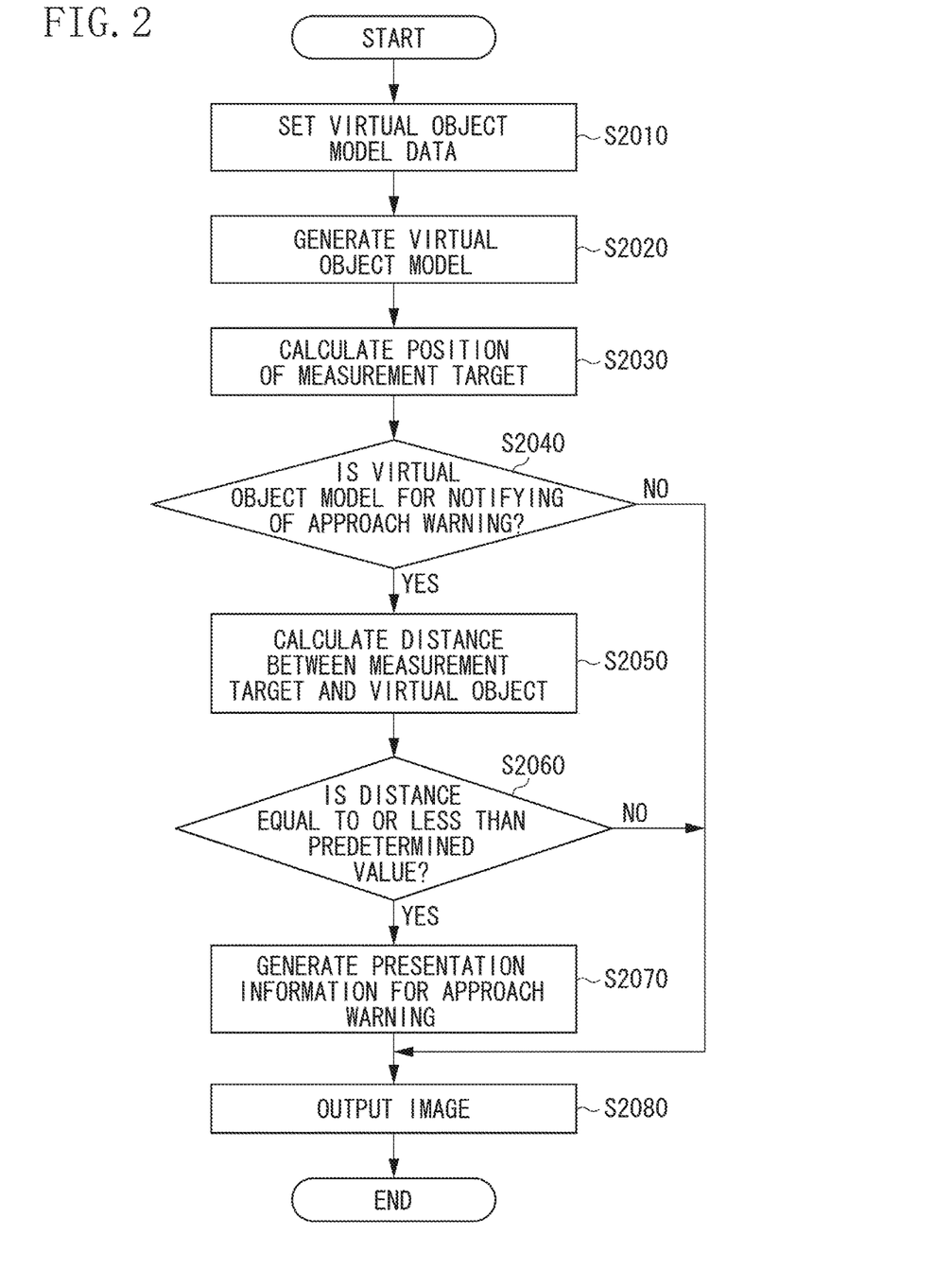
FIG. 2 is a flowchart of a process of appending an attribute for an approach warning notification to a virtual object and thus issuing an approach warning notification when a measurement target has approached the virtual object.

Now, with reference to FIG. 2, a flowchart of a process of the information processing apparatus 1000 according to the present exemplary embodiment will be described.
(Step S2010)

In step S2010, the model data setting unit 1010 sets virtual object model data to be newly created.

Figure 7:
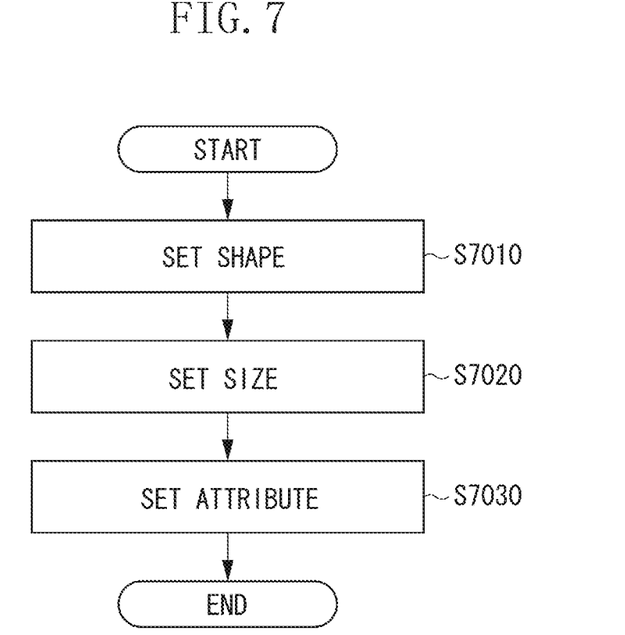
FIG. 7 is a flowchart of a process of setting an attribute of a virtual object.

This step will be described with reference to the flowchart illustrated in FIG. 7.
(Step S7010)

In step S7010, the model data setting unit 1010 sets a basic shape of the virtual object model data to be newly created. For example, the basic shape is a plane, a cube, or a quadrangular prism. It is to be noted that the basic shape is not limited to the aforementioned shapes and may be a triangular prism, a circular cylinder, a triangular pyramid, a cone, and so on. Which basic shape is to be employed for the model may be set, for example, by presenting a GUI illustrated in FIG. 6 to the user and employing a shape selected by the user through a button 3010 on the GUI. Alternatively, a predetermined shape may, for example, be set.
(Step S7020)

Figure 6:
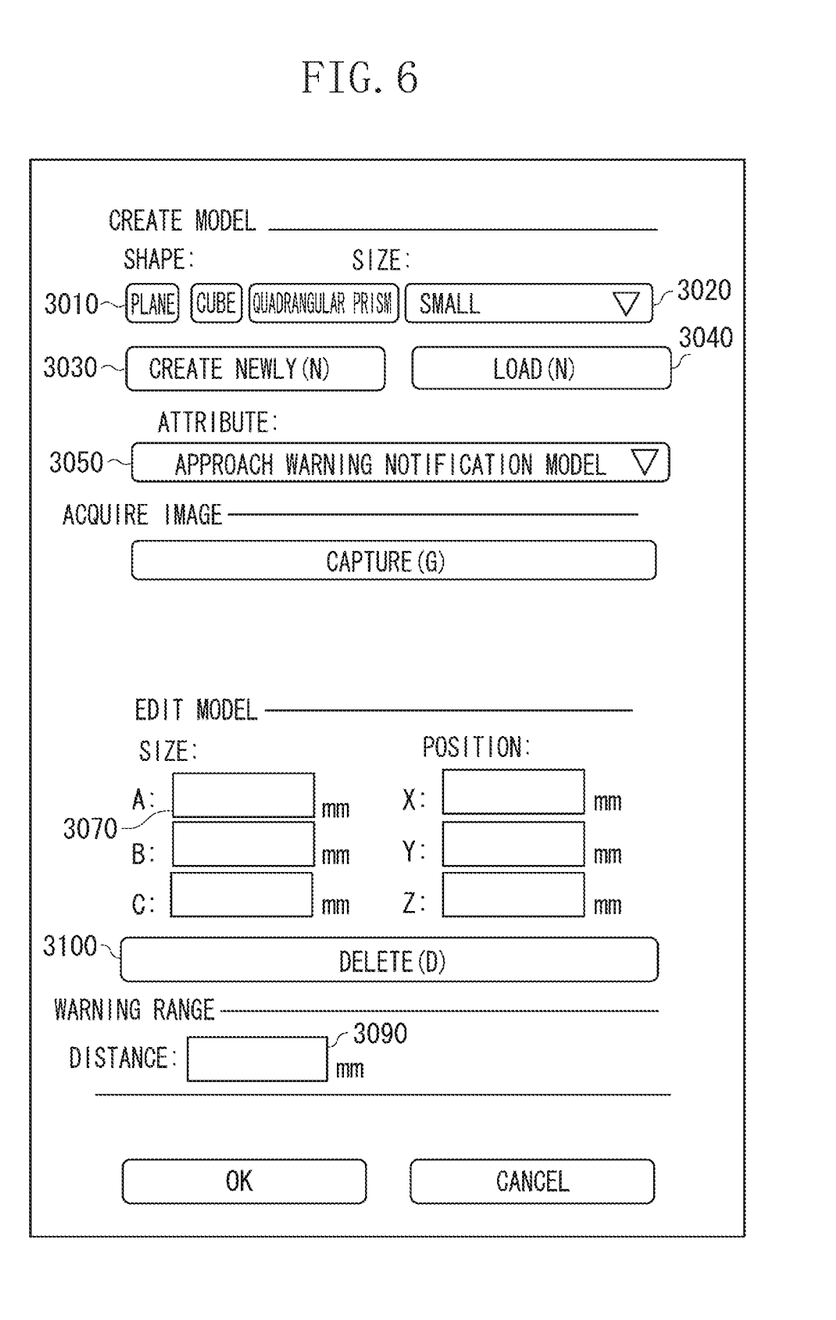
FIG. 6 is an illustration for describing a graphic user interface (GUI) for creating virtual object model data to which an approach warning notification attribute is to be appended.

In step S7020, the model data setting unit 1010 sets the size of the basic shape of the virtual object model set in step S7010. For example, a size selected by the user from a list box 3020 illustrated in FIG. 6 is set. In the present exemplary embodiment, several sizes such as large, medium, and small are set in the list box 3020, and the user can select a desired size from the list box 3020. Alternatively, a predetermined size may, for example, be set.
(Step S7030)

In step S7030, the model data setting unit 1010 sets an attribute to the virtual object model whose shape and size have been set in steps S7010 and S7020. The attribute is set by switching items in a list box 3050 illustrated in FIG. 6. Here, in the list box 3050 of the present exemplary embodiment, for example, in addition to an approach warning notification model, a mask attribute appending model, a mask attribute appending model and approach warning notification model can be switched thereamong. Here, each of the approach warning notification model and the mask attribute appending model will be described.

The approach warning notification model is a model used to calculate the distance between the virtual object and the HMD 600 serving as a measurement target and to notify the user if the calculated distance is less than a threshold value.

Subsequently, the mask attribute appending model will be described. The mask attribute appending model is a model for masking a real object so that a real object such as a wall and a column in a real image is not overwritten by a virtual object without taking depth information into consideration. When a real object is overwritten by a virtual object in an image without taking depth information into consideration, the depth-wise positional relation between the virtual object and the real object cannot be properly displayed, and thus the sense of immersion and the sense of presence noticeably deteriorate in a mixed reality system. Therefore, by cause the coordinate system of the real space to accord with the coordinate system of the virtual space and by disposing the mask attribute appending model properly at the position of the real object, for example, the depth-wise positional relation of the virtual object and the real object can be properly expressed. Accordingly, a virtual object in which the mask attribute appending model or the mask attribute appending model and approach warning notification model is set can be displayed with a proper depth-wise positional relation by comparing the depth value from another virtual object with the depth value from the viewpoint position of the imaging unit 400.

(Step S2020)

In step S2020, the virtual object generation unit 1020 generates a virtual object model having the model data set in step S2010. The virtual object generation unit 1020, for example, creates a virtual object model having the basic shape, the size, and the attribute set in steps S7010 to S7030, in response to the user pressing a new creation button 3030 illustrated in FIG. 6. Alternatively, the virtual object generation unit 1020 may generate a virtual object model by loading a previously created virtual object model, in response to the user pressing a load button 3040 illustrated in FIG. 6.

(Step S2030)

In step S2030, the virtual object generation unit 1020 arranges the virtual object model having the model data set in step S2010 so that the virtual object model accords with the real object in the real space. In the present exemplary embodiment, the virtual object is arranged at a predetermined position based on a model disposition index 5000 illustrated in FIG. 8.

First, the user arranges the model disposition index 5000 so as to align it with the position of the real object. In a case in which the real object is a table, for example, the model disposition index 5000 is arranged so as to align it with a leg portion of the table in a predetermined plane direction. The model disposition index 5000 includes a positioning mark 5010 for determining a position of a virtual object model for an approach warning notification or masking, as illustrated in FIG. 8. In the present exemplary embodiment, as illustrated in FIG. 8, the model disposition index 5000 is arranged so as to contact a plane that contacts two positioning marks 5010 and that is orthogonal to the model disposition index 5000. The arranged model disposition index 5000 is imaged by an imaging device, and the captured image is acquired by the image acquisition unit 1030. The index is then detected from the acquired image, and thus the position at which the model disposition index 5000 is arranged can be acquired.

The user can also set the size and the position of the virtual object model in a more detailed manner. For example, the values of the size and the position of the virtual object model that the user directly inputs in an edit box 3070 illustrated in FIG. 6 can be reflected on the size and the position of the virtual object model. In addition, the virtual object may be superimposed on an acquired image to display the resultant, and the user may drag a boundary of the virtual object by using a mouse or the like so as to change the size of the virtual object. Furthermore, the user may drag a coordinate axis displayed inside the virtual object so as to change the position thereof.

(Step S2030)

In step S2030, the measurement target position acquisition unit 1040 measures the position and the orientation of the HMD 600 through a well-known method. The position and orientation information of the measurement target measured by the measurement target position acquisition unit 1040 may be obtained through any well-known method. In the present exemplary embodiment, the imaging unit 400 images a known index, and thus the position and the orientation of the measurement target is obtained.

The measurement target position acquisition unit 1040 transmits the measured position and orientation information of the measurement target to the distance calculation unit 1050 and the observation virtual object generation unit 1070.

(Step S2040)

In step S2040, the distance calculation unit 1050 determines whether the attribute of the virtual object generated in step S2020 is the approach warning notification model. As described in step S2020, one of the approach warning notification model, the mask attribute appending model, and the mask attribute appending model and approach warning notification model is set in a virtual object. In this step, the distance calculation unit 1050 determines whether the attribute is either of the approach warning notification model, and the mask attribute appending model and approach warning notification model. If it is determined that the attribute is either of the approach warning notification model, and the mask attribute appending model and approach warning notification model (YES in step S2040), the processing proceeds to step S2050. Meanwhile, if it is determined that the attribute is the mask attribute appending model (NO in step S2040), the processing proceeds to step S2080.

(Step S2050)

In step S2050, the distance calculation unit 1050 obtains the distance between the HMD 600 and the virtual object. The distance calculation unit 1050 measures the distance between the imaging unit 400 serving as the measurement target and a virtual object for which the approach warning notification attribute flag 301 is ON. It is to be noted that the origin and the directions of the axes of the coordinate system defined in the real space accords in advance with the origin and the directions of the axes of the coordinate system defined in the virtual space by setting the coordinate system defined in the real space by the above-described index. As the coordinate systems of the real space and of the virtual space accord with each other, even when the imaging unit 400 serving as the measurement target moves in the real space, the distance can be measured by comparing the position of the imaging unit 400 in the real space with the position of the virtual object. Accordingly, the distance calculation unit 1050 calculates the distance based on the position of the measurement target and the position of the virtual object for which the approach warning notification attribute flag 301 is ON.

(Step S2060)

In step S2060, the approach warning generation unit 1060 determines whether the distance calculated in step S2050 is equal to or less than a threshold value. The threshold value may be determined based on a value that the user inputs in an input box 3090 illustrated in FIG. 6 or may be determined in advance. If it is determined that the calculated distance is equal to or less than the threshold value (YES in step S2060), the processing proceeds to step S2070. Meanwhile, if it is determined that the calculated distance is greater than the threshold value (NO in step S2060), the processing proceeds to step S2080.

(Step S2070)

In step S2070, the approach warning generation unit 1060 generates the presentation information for the approach warning. The presentation information is, for example, an icon s as illustrated in FIGS. 5A and 5B. Then, the approach warning generation unit 1060 transmits the generated presentation information to the composite image generation unit 1080.

(Step S2080)

In step S2080, the composite image generation unit 1080 combines the captured image acquired by the image acquisition unit 1030 with the observation virtual object acquired by the observation virtual object generation unit 1070 so as to generate a composite image. In addition, in a case in which the presentation information has been generated by the approach warning generation unit 1060, the presentation information is appended to the composite image, and the resulting image is transmitted to the HMD 600. In addition, in a case in which the observation virtual object is to be combined in a region in which a virtual object that has been determined to be the mask attribute appending model or the mask attribute appending model and approach warning notification model in step S2040 is arranged, the depth values of the virtual object and of the observation virtual object are compared. Then, the virtual object is combined only in a case in which the observation virtual object is located closer to the HMD 600 than the virtual object is.

As described thus far, when the user approaches a virtual object having an approach warning notification attribute in a mixed reality space, the information processing apparatus 1000 can issue the approach warning notification to the user.

In addition, setting the approach warning notification attribute flag for each virtual object makes it possible to configure the settings such that a warning is not issued when the user approaches a real object that the user wants to approach and a warning is issued only for a real object of which the user needs to be notified.

First Modification

In the first exemplary embodiment, the approach warning generation unit 1060 presents the approach warning notification information by superimposing an icon or characters on an image captured by the imaging unit 400. However, the presentation mode is not limited thereto as long as an approach warning notification can be issued. For example, an approach warning may be presented by sound through a speaker (not illustrated). Alternatively, an approach warning may be presented by vibrating a vibrator (not illustrated). The presentation mode is not limited to the above, and even a well-known presentation mode that allows an approach warning to be issued may be employed.

Second Modification

In the first exemplary embodiment, the measurement target is the imaging unit 400 mounted on the HMD 600, but the measurement target is not limited thereto. The measurement target may be a body part, such as a hand, a leg, and an arm. When a hand or the like serves as a measurement target, a skin color may be registered in advance by two imaging units mounted on the HMD, and thus a hand skin color region may be extracted. Then, the depth may be measured through a stereo method based on the known relative position and orientation information of the right and left imaging units. Alternatively, the position may be measured by measuring the depth through imaging with two imaging units arranged so as to overlook a body part of the user. As another alternative, the measurement may be carried out with a depth sensor. As long as the position of the measurement target can be measured, the position may be measured through any other well-known method.

When a virtual object model becomes unnecessary, the user presses a deletion button 3100 to delete the virtual object model.

Although in the present exemplary embodiment, an HMD has been described that is to be mounted on the head of the user, a face-mounted display that is to be mounted on the face may instead be used.

Although a table is illustrated as an example of the real object in the present exemplary embodiment, any portion such as a wall or a step in a floor can be set as a real object in a case where the user wants to be notified of an approach to the portion.

As described thus far, virtual object model data can be generated using a GUI in accordance with a real object for which an approach warning is to be issued. A user adjusts the size, the shape, and the disposition information while watching a video image in which a virtual object is superimposed on a real video image, and thereby, the user can intuitively and efficiently set a virtual object for which an approach warning is to be issued or which is to be masked in accordance with a real object.

Other Exemplary Embodiments

The present invention can also be implemented by carrying out the following processes.

According to the present invention, it is possible to notify a user that the user has approached a real object in a real space.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-186531, filed Sep. 12, 2014, which is hereby incorporated by reference herein in its entirety.

What is claimed is:

1. An information processing apparatus comprising a processor and a memory containing instructions that when executed by the processor, cause the processor to perform operations, comprising:
storing attribute data having a first attribute and a second attribute that is different from the first attribute in association with a position of a virtual object;
outputting warning information for a user, based on a position of the user and the position of the virtual object associated with which the attribute data in a case where the first attribute indicates outputting of the warning information for the user;
generating an image, in a case where the second attribute which indicates masking of a virtual object is set in accordance with a position of a first virtual object without drawing a second virtual object in a region in which the position of the first virtual object is closer to the position of the user than a position of the second virtual object, based on the position of the real object with which the data is associated and the position at which the virtual object is arranged, and by drawing the second virtual object in a region in which the position of the first virtual object is associated is farther from the position of the user than the position of the second virtual object; and
outputting the image.

2. The information processing apparatus according to claim 1, further comprising:
comparing the position of the user with the position of the virtual object associated with the attribute data.

3. The information processing apparatus according to claim 2, wherein the comparing includes calculating a distance between the position of the user and the position of the virtual object, by comparing the position of the user with the position of the virtual object associated with the attribute data.

4. The information processing apparatus according to claim 3, wherein the outputting outputs the output warning information in a case where the distance indicates a value less than a threshold value.

5. The information processing apparatus according to claim 1, wherein a shape and a size of the virtual object is determined based on an input by the user in relation to a base model having a shape and a size set in advance.

6. The information processing apparatus according to claim 5, wherein the shape is polyhedral.

7. The information processing apparatus according to claim 1, wherein the virtual object is generated based on a captured image of an index arranged at a position of a real object in a real space.

8. The information processing apparatus according to claim 1, further comprising:
mounting an imaging device on one of a head and a face of the user;
acquiring a captured image captured by the imaging device; and
generating a composite image by combining the captured image acquired by the acquiring with the generated image,
wherein the outputting warning information appends the warning information to the composite image and outputs the warning information.

9. An information processing apparatus configured to perform operations, comprising:
setting at least one of a first attribute and a second attribute that is distinct from the first attribute in a first virtual object generated based on virtual object model data;
generating the first virtual object at a position in a virtual space corresponding to a predetermined position in a real space based on the at least one of the first and second attributes set in the setting and the virtual object model data;
acquiring a position of a user;
calculating a distance between the user and the first virtual object based on the position of the user and the position of the first virtual object;
generating a virtual image to be viewed by the user by drawing a second virtual object that is different from the first virtual object; and
outputting the virtual image,
wherein, in a case in which the first attribute is set in the first virtual object, if the calculated distance indicates a value less than a threshold value, the outputting further outputs information indicating that the user is approaching the predetermined position in the real space, and
wherein, in a case in which the second attribute is set in the first virtual object, the generating does not draw the second virtual object in a region in which the position of the first virtual object is closer to the position of the user than the position of the second virtual object and draws the second virtual object in a region in which the position of the first virtual object is farther from the position of the user than the position of the second virtual object.

10. The information processing apparatus according to claim 9, wherein the calculating calculates the distance in a case in which the first attribute is set and the user is set to be notified that the user is approaching the predetermined position in the real space.

11. The information processing apparatus according to claim 9, wherein a shape or a size of the first virtual object to be generated is determined based on an input by the user in relation to a base model having a shape and a size set in advance.

12. The information processing apparatus according to claim 11, wherein the shape is polyhedral.

13. The information processing apparatus according to claim 9, wherein the generating generates the first virtual object at a position in the virtual space corresponding to a position of a mark included in a real index based on a captured image of the real index that includes the mark that is arranged at the predetermined position in the real space and that indicates a position at which the first virtual object is to be generated.

14. The information processing apparatus according to claim 9, wherein the setting sets at least one of the first attribute and the second attribute based on an input by the user.

15. The information processing apparatus according to claim 9, further comprising:
mounting an imaging device on one of a head and a face of the user;
acquiring a captured image captured by the imaging device; and
generating a composite image by combining the captured image acquired by the acquiring with the virtual image,
wherein the outputting appends the information to the composite image and outputs the composite image.

16. An information processing method executed by an information processing apparatus including a storing unit configured to store attribute data having a first attribute and a second attribute that is different from the first attribute in association with a position of a virtual object, the method comprising:

outputting warning information for a user, based on a position of the user and the position of the virtual object associated with the attribute data in a case where the first attribute indicates outputting of the warning information for the user;

generating an image, in a case where the second attribute which indicates masking of a virtual object is set in accordance with a position of a first virtual object, without drawing a second virtual object in a region in which the position of the first virtual object is closer to the position of the user than a position of the second virtual object, based on the position of the real object with which the data is associated and the position at which the virtual object is arranged, and by drawing the second virtual object in a region in which the position of the first virtual object is farther from the position of the user than the position of the second virtual object; and outputting the image.

17. A non-transitory storage medium storing a program that causes an information processing method to be executed, the information processing method comprising:

storing attribute data having a first attribute and a second attribute that is distinct from the first attribute in association with a position of a virtual object;

outputting warning information for a user, based on a position of the user and the position of the virtual object associated with the attribute data in a case where the first attribute indicates outputting of the warning information for the user;

generating an image, in a case where the second attribute which indicates masking of a virtual object is set in accordance with a position of a first virtual object, without drawing a second virtual object in a region in which the position of the first virtual object is closer to the position of the user than a position of the second virtual object, based on the position of the real object with which the data is associated and the position at which the virtual object is arranged, and by drawing the second virtual object in a region in which the position of the first virtual object is farther from the position of the user than the position of the second virtual object; and outputting the image.

* * * * *